United States Patent
Gibson et al.

(10) Patent No.: US 6,262,738 B1
(45) Date of Patent: Jul. 17, 2001

(54) METHOD FOR ESTIMATING VOLUMETRIC DISTANCE MAPS FROM 2D DEPTH IMAGES

(76) Inventors: Sarah F. F. Gibson, 15 Mystic View Ter., Arlington, MA (US) 02474; Ronald N. Perry, 32 Linnaean St., Cambridge, MA (US) 02138

(*) Notice: Subject to any disclaimer, the term of this patent is extended or adjusted under 35 U.S.C. 154(b) by 0 days.

(21) Appl. No.: 09/206,071

(22) Filed: Dec. 4, 1998

(51) Int. Cl.[7] .................................................. G06F 15/00
(52) U.S. Cl. ............................................................. 345/419
(58) Field of Search .................................... 345/418, 419, 345/420, 421, 422, 424

(56) References Cited

U.S. PATENT DOCUMENTS

| | | | |
|---|---|---|---|
| 5,923,329 | * | 8/2000 | Beale .................................... 345/418 |
| 5,995,108 | * | 11/1999 | Isobe et al. ........................... 345/421 |
| 6,084,587 | * | 7/2000 | Tarr et al. ............................. 345/419 |
| 6,111,582 | * | 8/2000 | Jerkins .................................. 345/421 |

OTHER PUBLICATIONS

Sarah F. F. Gibson, "Linked Volumetric Objects for Physical–based Modeling", Mitsubishi Electric Research Laboratories Technical Report TR97–20, Nov. 4, 1997.

* cited by examiner

*Primary Examiner*—Phu K. Nguyen

(57) ABSTRACT

A volumetric distance map of an object is generated from one or more depth images of the object. Each depth image is projected onto the object by casting parallel rays to the object. The parallel rays are cast perpendicular to the depth image. Sample points in a projected distance volume represent distances from the distance map to a surface of the object. The magnitude of a local gradient at each sample point of the projected distance volume is determined, and each distance at each sample point is divided by the magnitude of the corresponding local gradient at each sample point to obtain a scalar distance to a closest surface of the object.

11 Claims, 14 Drawing Sheets

Pseudo code for shaded volume reading using Distance Map.

```
For each pixel in the image {
    For each sample point along the
      ray projected into the volume {
        - Calculate the distance at the sample point from distances
            at neighboring grid points
        - if the distance is positive (inside the object) {
            - calculate the color and transparency of the sample point
                using the intensity of the values of neighboring grid points
            - calculate the gradient of the distance map from distances
                at neighboring grid points
            - use the gradient and the color to calculate the shaded
                color at the sample point
            - composite the shaded color onto the current ray color
        }
    }
}
```

FIG. 6

$d_{obj}(i, j, k) = \min(d_\Delta(i, j, k) \Delta ))\}$ 138 all $\Delta$'s where $d_{obj}(i, j, k)$ is dist. to object from $(i, j, k)$ and $d_\Delta(i, j, k)$ is dist. to $\Delta$ from $(i, j, k)$ For each $\Delta$, for grid points in a neighborhood of the $\Delta$, if $|d_\Delta(i, j, k)| \ll |d_{obj}(i, j, k)|$ then set $d_{obj}(i, j, k) = d_\Delta(i, j, k)$

154

METHOD FOR ESTIMATING VOLUMETRIC DISTANCE MAPS FROM 2D DEPTH IMAGES

FIELD OF THE INVENTION

The invention relates generally to computer graphics, and more particularly to estimating 3D distance maps from 2D depth images.

BACKGROUND OF THE INVENTION

Distance maps are typically 2D or 3D discrete arrays of sampled values. The sampled values represent distances to the closest points on the surface of an object that is modeled in a computer. One can apply discrete interpolation methods, such as tri-linear interpolation, on distance maps to estimate the distance from any non-grid point within the sampled volume to the surface of the object.

The zero-value iso-surface of a signed distance map represents the surface of the object. In addition, the gradient vector of the distance map points in the direction of the closest surface point, and hence, for points near object surfaces, the gradient of the distance map is a good approximation of the surface normal of the object.

Many applications in the fields of computer graphics and robotics can make use of distance maps in visualization, planning or modeling. For example, in "Towards the Automatic Control of Robot Assembly Tasks Via Potential Functions: The Case of 2-D Sphere Assemblies" by Koditschek et al., mobile robots use distance maps of the local environment to determine an obstacle-free path. Sramek uses distance maps in "Fast Surface Rendering from Raster Data by Voxel Traversal Using Chessboard Distance" Proceedings IEEE Visualization, 1994, to increase the speed of volume rendering by allowing the renderer to quickly skip empty regions in the volume.

Yagel et al. use distance maps in "Volume-based Re-zoning and Visualization of Diecasting," in Proceedings IEEE Visualization, 1994, for locating problematic regions in computer models of mechanical structures where part thickness may be too large for the manufacturing process. Gibson uses distance maps to accurately reconstruct surface normals for use in shaded volume rendering, as described in "Using Distance Maps for Accurate Surface Representation in Sampled Volumes" Proceedings IEEE Visualization, 1998. In addition, "Linked Volumetric Objects for Physical-based Modeling," MERL Technical Report TR97-20 by Gibson, discusses the use of both distance values and the gradient of the distance map for calculating impact force vectors between colliding graphical objects as the calculation of interaction forces between a haptic force feedback device and a virtual object model.

Object scanning is the process of acquiring a computer model of a real-world object from image or range data. Scanning is done with many techniques. Most methods generate a "cloud," or grid, of 3D points that lie on the object's surface. A model of the object is constructed by fitting surfaces to these points. However, as was discussed in Gibson's "Using Distance Maps for Accurate Surface Representation in Sampled Volumes," distance maps provide a much more robust representation of object surfaces than sampled object points. Hence, if the range images were used to generate 3D distance maps, rather than clouds of surface points, then better scanned models can be obtained.

In the prior art, a number of methods for generating distance maps from object models are known. When the object model is an analytic function, the distance map can be generated procedurally. For example, for a spherical object centered at $(x_0, y_0, z_0)$ with radius R, the signed distance map value can be calculated at a grid point $(i, j, k)$ as:

$$d=R-sqrt((i-x_0)^2+(j-y_0)^2+(k-z_0)^2).$$

In this example, the signed distance is positive inside the object and negative outside the object. Unfortunately, only a limited number of objects have simple procedural definitions for the distance map.

When the object is represented by a binary volume, where elements in the volume are either on or off, there are a number of methods that can be used for estimating the distance map. Some of these methods are described for the 2D case in "The Image Processing Handbook", by J. Russ. Extensions to 3D are discussed, for example, in "Local Distances for Distance Transformations in Two and Three Dimensions," a Ph.D. thesis from Delft University by B. Verwer, 1991.

However, as discussed in "Calculating Distance Maps from Binary Segmented Data," by Gibson in MERL Technical Report WP98-01, these methods only approximate the distance to the true surface of the binary object and the resultant distance map does not generate smooth surface normals. In "Constrained Elastic Surface Nets: Generating Smooth Surfaces from Binary Segmented Data," Proceedings Medical Image Computation and Computer Assisted Interventions, 1998, Gibson presented a method for creating smooth polygonal surfaces from binary data and generating the corresponding distance maps from this polygonal model.

When the object is represented by a polygonal model, the distance map is determined by finding the closest polygon, edge, or vertex in the model, and calculating the distance to that feature. One straightforward method for doing this is to consider each grid point in the distance map individually, find the closest polygon in the model by searching the list of polygons, and then calculating the distance from the grid point to that closest polygon. A second straightforward method is to consider each polygon in the object model one at a time, calculate the distance from the polygon to each grid point within a limited distance from the polygon, and replace each grid value in the distance map if the new distance has a smaller magnitude than the existing value.

Both of these methods for calculating distance maps from a polygonal model are adequate, when the distance map is calculated for a static object in a pre-processing step. However, both of these methods are unsuitable for time constrained interactive applications in which the shape or topology of the polygon model is changing.

For example, in complex models with as many 100,000 or more triangles, it may take minutes to calculate the distance map using either of these two methods. When the object model is deforming, or its shape is interactively changing, interactive systems require new distance maps within seconds for path planning, within 10's of milliseconds for rendering and most physics-based modeling systems, and within milliseconds for haptics. Even with algorithms for adaptive updating of distance maps, these two techniques for generating distance maps are computationally intensive, and require a significant portion of available processing power.

Therefore, there is a need for a method that can rapidly estimate distance maps from depth images.

SUMMARY OF THE INVENTION

The present invention approximates 3D distance maps from range images of real-world objects or from triangulated object models using single or multiple projected 2D depth images. The invention can be used in systems where 2D depth images of real-world objects are obtained with range sensing devices, or in systems where the 2D depth images of virtual object models are obtained by calculating the projected distance from each point in the depth image to the object model. These systems can include means for performing the projection particularly fast using polygon rendering hardware and a graphics z-buffer.

As stated above, distance maps are a discrete representation of the distance from grid points in the volume to the closest point on the object surface. Using an interpolation function, such as tri-linear interpolation, distances at grid points can be used to estimate the closest distance from any point within the volume to the surface. In addition, near the surface, the gradient of the distance map can be used to estimate the surface normal.

Distances to object surfaces can be used in a number of applications. For example, the distance maps can be used to determine a path that stays a minimum distance away from objects or an obstacle-free path with minimum length for a mobile robot. As a second example, distance maps can be used in volume rendering to detect surfaces and surface normals that are required for determining surface reflections in shaded volume rendering.

As a third example, distance maps can be used in haptics, where an electromechanical device allows the user to "feel" the surface of a virtual object by providing force feedback to resist the user's tool when the tool penetrates the surface of the virtual object. Haptic feedback requires both the depth of penetration of the tool into the virtual object and the normal of the closest surface point to generate the resisting force vector. The present invention generates 3D distance maps from 2D projected depth images. Accordingly, a projected distance volume is generated from the depth image. Each sample in the projected distance volume is the distance to a surface point of the object in the projection direction. The distances in the projected volume are adjusted according the local gradient of the projected volume. More specifically, the distance is divided by the magnitude of the corresponding local gradient. The thus adjusted distances of the projected volume correctly represent the true distance map for planar surfaces, and closely approximate the true distance map near curved surfaces of the object.

The present invention can be used in a system that uses graphics hardware and a graphics z-buffer to rapidly calculate the 2D projected depth images which are used to generate the projected distance volume for the above method. In addition, the invention can be used with a system that uses multiple range images acquired by a range sensor of a real-world object, and the above method for approximating distance maps from projected depth images for 3D scanning.

BRIEF DESCRIPTION OF THE DRAWINGS

FIG. 6 is pseudocode of a system using distance maps for calculating surface normals for shading in volume rendering;

FIG. 8A is a diagrammatic description of a second method for calculating the distance map from a triangulated model;

DETAILED DESCRIPTION OF THE INVENTION

Figure 1:
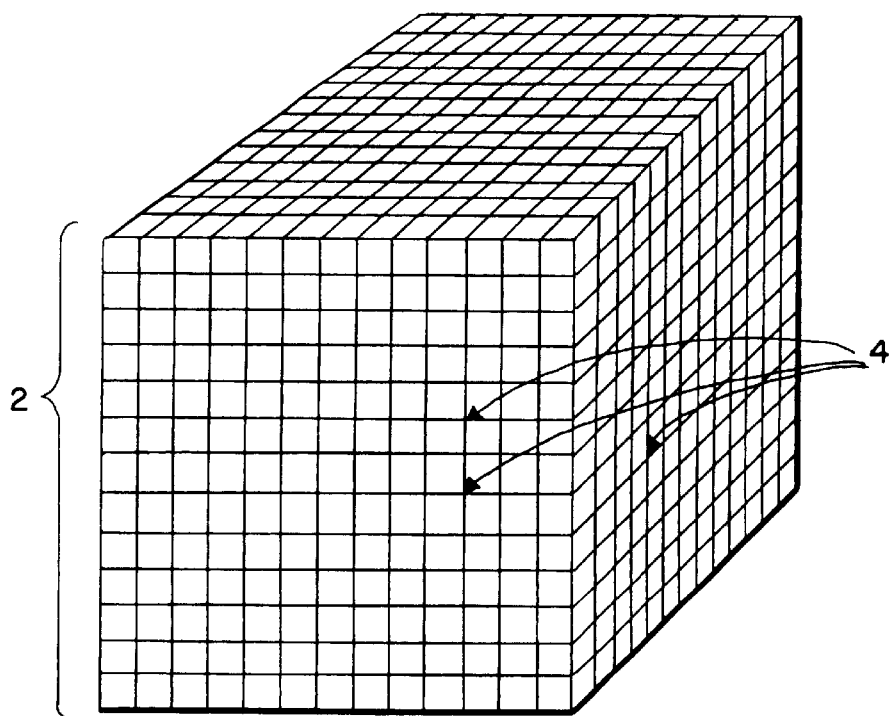
FIG. 1 is a diagrammatic description of a volumetric distance map.

As shown in FIG. 1, distance maps are 2D or 3D grids 2 of sampled points 4. Each sample point represents the distance to the closest surface point of a represented object.

Figure 2:
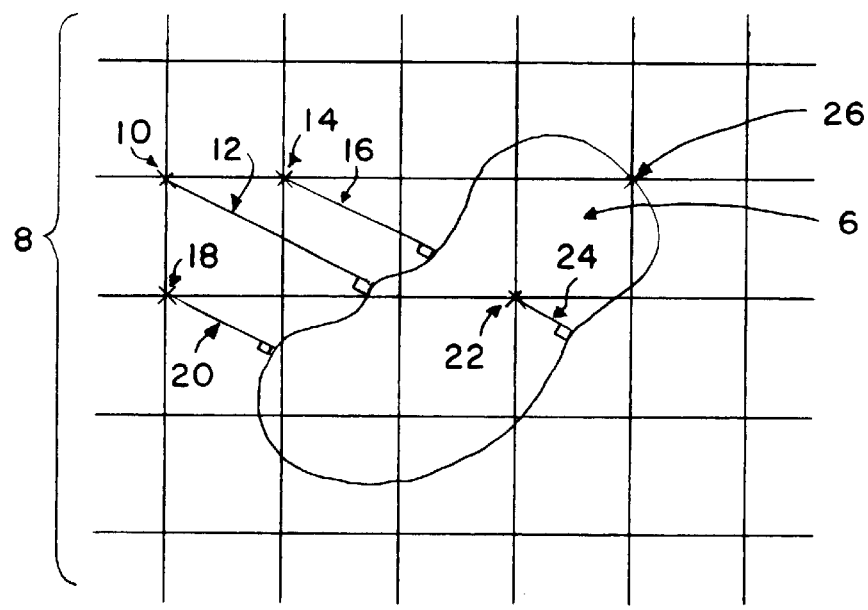
FIG. 2 is a diagrammatic description of the elements in a 2D distance map superimposed on the represented 2D object.

Referring to FIG. 2 for a 2D distance map, distances from an object 6 to points in the grid 8 are represented as follows. Distances 12, 16, and 20 are negative distances from the edge of the 2D object to the exterior points 10, 14, and 18 respectively. Distance 24 is a positive distance to the interior point 22, and a distance of zero is recorded for the point 26. Point 26 is located exactly on the edge of the 2D object.

Figure 3:
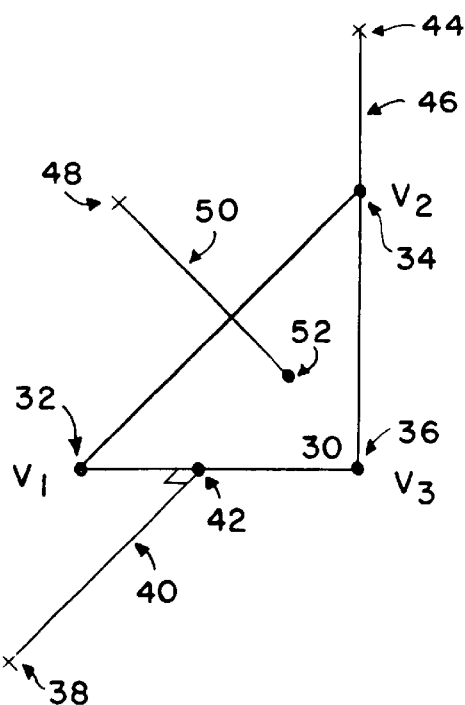
FIG. 3 is a diagrammatic description of the measurement of distance from a point in R3 to the face, edge, and vertex of a triangle in R3.

As shown in FIG. 3, the distances from a 3D triangle 30 with vertices v1, v2, and v3 (32, 34, and 36 respectively), can be calculated as follows. For points that are closest to the face of the triangle, such as point 48, the distance 50 to the closest point on the triangle 52 can be calculated as the magnitude of the dot product of the vector from the point to one of the vertices of the triangle and the triangle normal.

For points closest to an edge of the triangle, such as point 38, the distance 40 to the closest point on the edge 42 can be calculated as the magnitude of the cross product of the normalized vector along the edge from v1 to v3 and the vector from the point 38 to the vertex v3. For points closest to a vertex of the triangle, such as 44, the distance 46 to the vertex 34 can be calculated as the magnitude of the vector from the point to the vertex.

Figure 4:
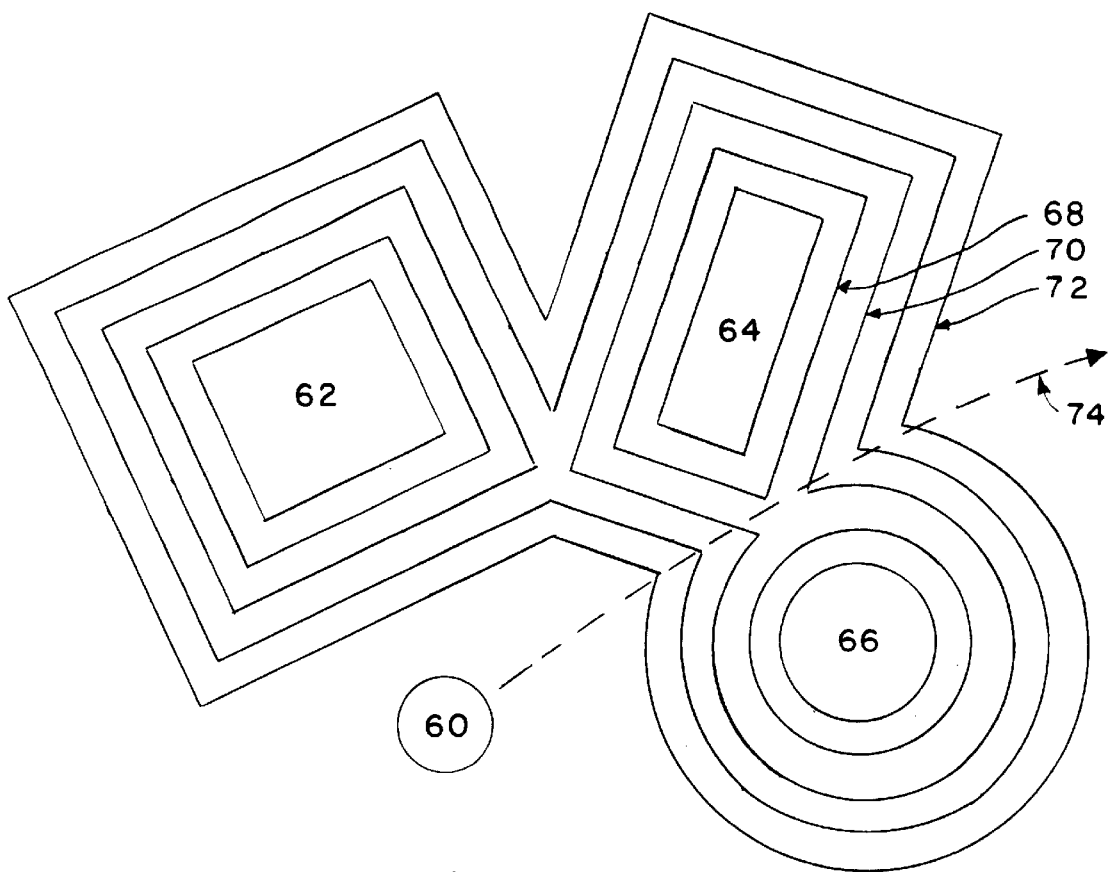
FIG. 4 is a diagrammatic description of the use of a 2D distance map for obstacle avoidance by a mobile robot.

As shown in FIG. 4, distance maps can be used for path planning and obstacle avoidance in robotics. This figure illustrates a system that determines a path for a robot with footprint 60 through an environment with obstacles 62, 64, and 66. One approach is to generate a 2D distance map of the robot's environment. Contours of increasing distances from the obstacles are indicated as 68, 70, and 72. Using this distance map, the robot's operator is able to chose a path 74 which satisfies constraints on how closely the robot can come to the obstacles.

Figure 5A:
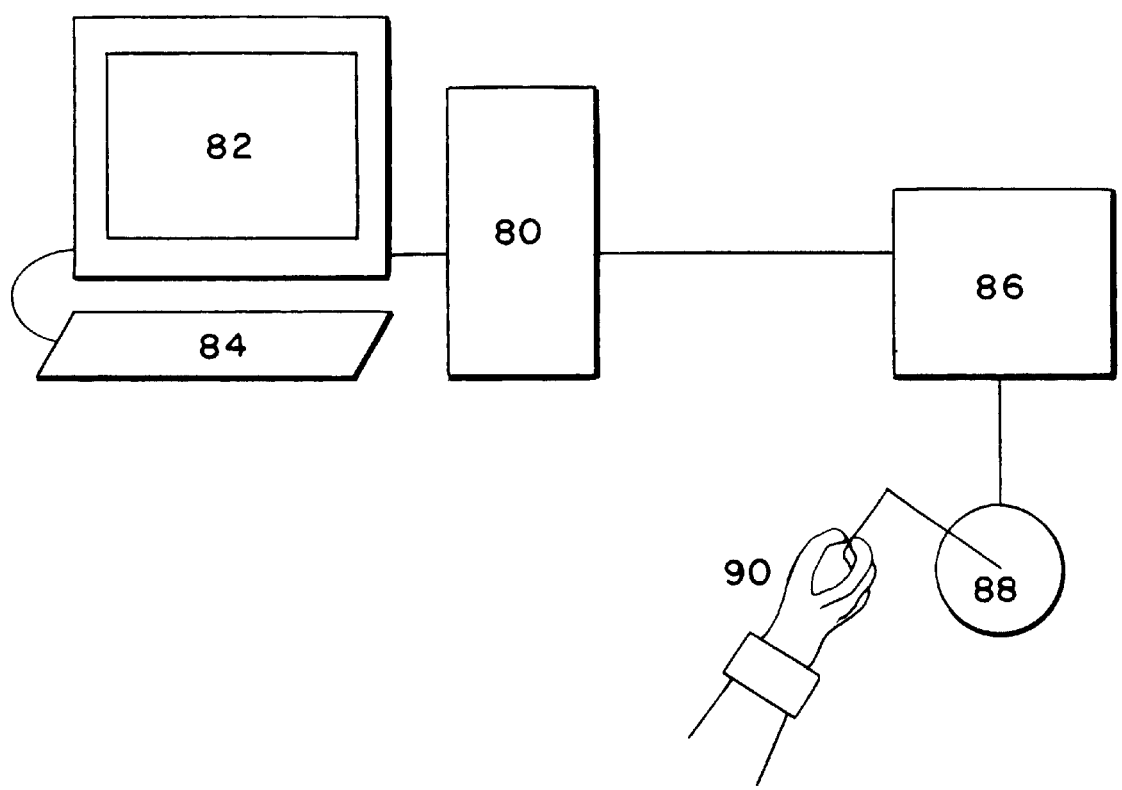
FIG. 5A is a block diagram of a computer system using distance maps.

As shown in FIG. 5A, distance maps can be used to calculate reaction forces for a haptic feedback device that is interacting with a virtual environment. A computer system 80 uses the distance map to detect collisions between the end effector of the haptic device and the object models, and calculates reaction forces due to impacts with the objects. The forces are converted by a haptic device controller 86 into control signals for the haptic device 88, and ultimately to reaction forces that are applied to the user 90. A computer monitor 82 provides visual feedback and other input devices, such as a keyboard 84, provide other means for interacting with the system.

Figure 5B:
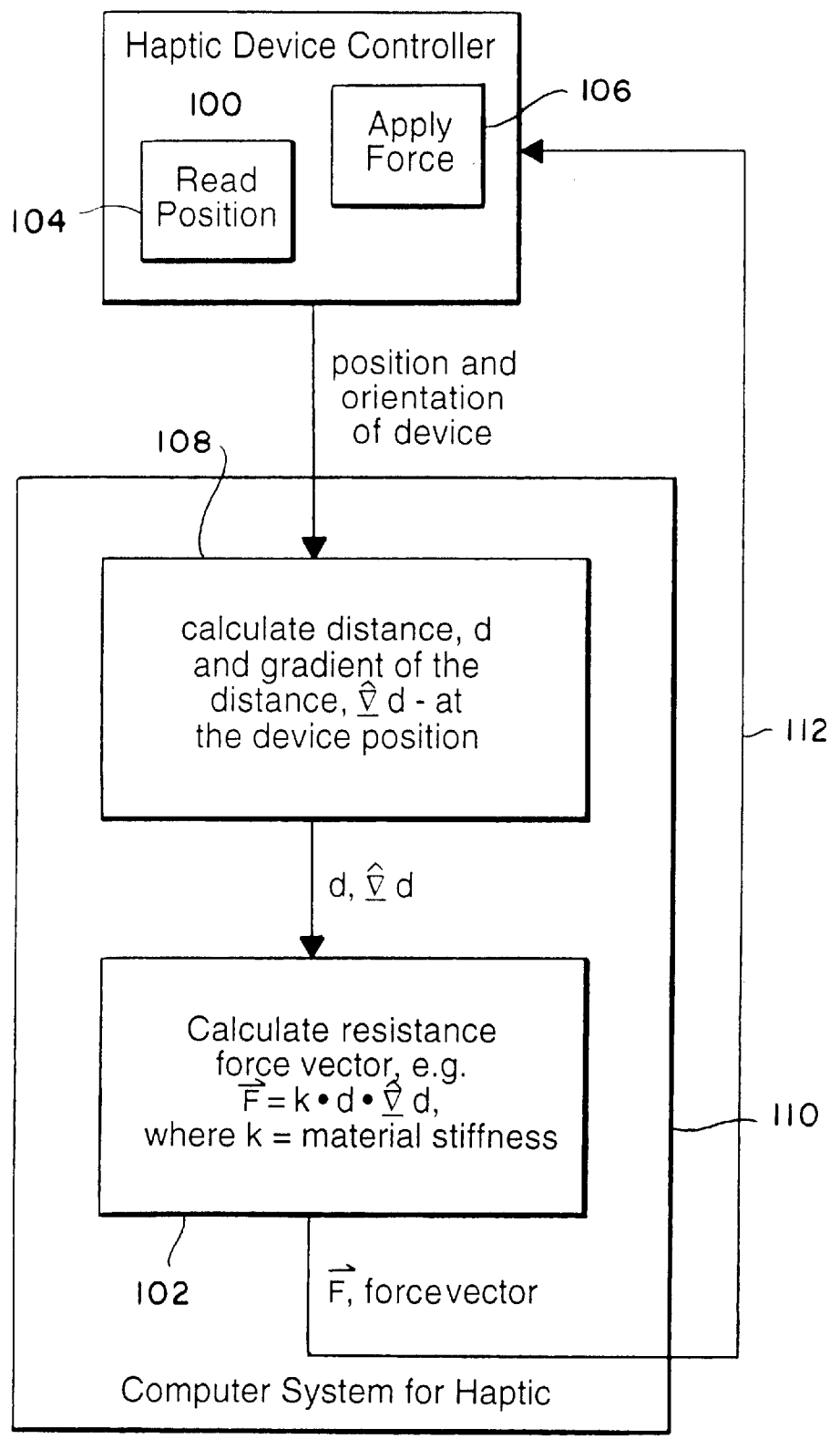
FIG. 5B is a flow diagram of a use of a 3D distance map for force calculation in haptic feedback.

FIG. 5B is a flow chart that illustrates the operation of such a haptic interaction system. The system includes a haptic device controller 100, and a computer system 102. The haptic device controller reads the position and orientation of the device end effector from a device encoders 104 and makes these available to the computer system.

The haptic device controller also gets forces from the computer system and applies these to the device motors 106 to provide haptic feedback to the user. The computer system uses the distance map to determine whether the haptic end effector is contacting an object.

If the haptic device is contacting an object, then the computer system calculates the distance and the normal of the closest object surface point for the given position of the haptic device in step 108. Next, the system calculates the reaction force vector for the given object penetration 110 as the product of the spring constant of the object, the distance to the closest object surface point, and the normalized normal vector of the closest surface point. This calculated force is then sent to the haptic device controller as a signal via line 112.

FIG. 6 shows an example of pseudocode for performing shaded volume rendering from sampled volume data that contain color and transparency as well as distance map values. The distance map is first used to determine whether each sample point along rays cast into the volume are inside or outside of the object. The distance map is also used to calculate the gradient of object surfaces for shading the image.

Figure 7:
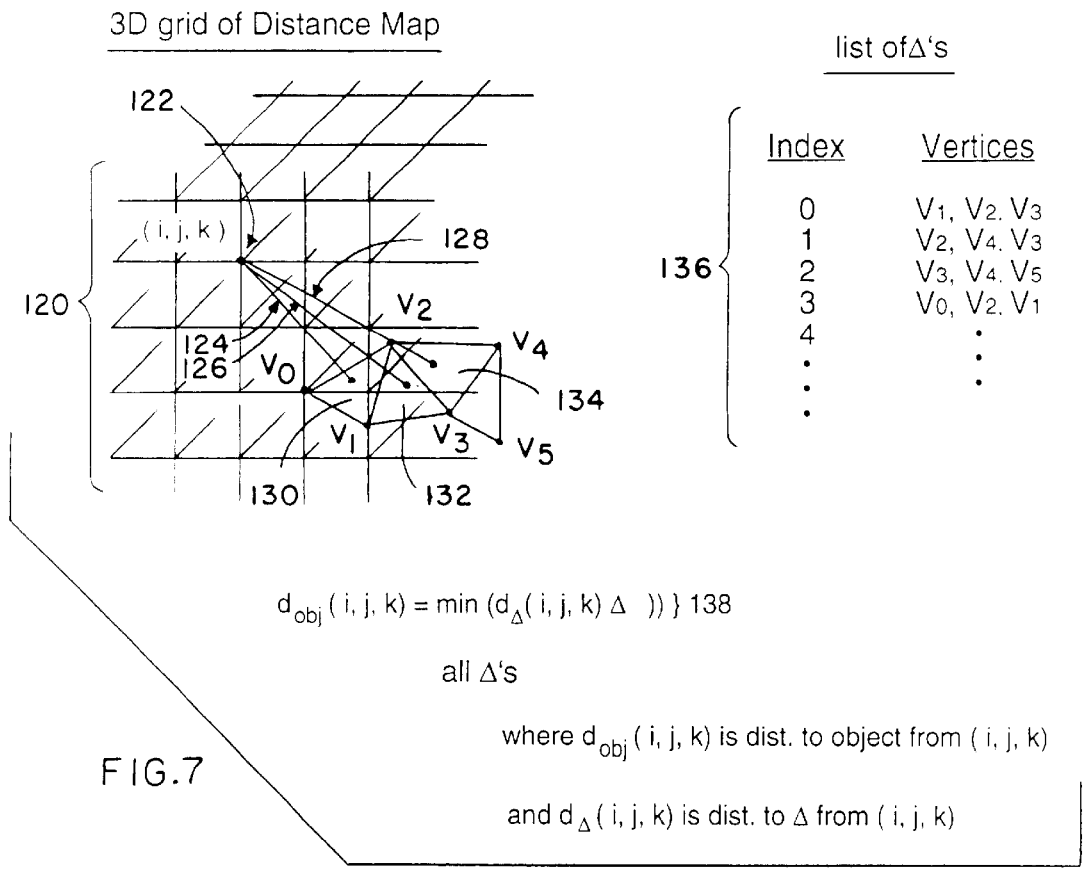
FIG. 7 is a diagrammatic description of one method for calculating the distance map from a triangulated model.

FIG. 7 shows a grid-based method for calculating the distance map from a triangulated model. Here, each point in the grid 120 is considered once. For example, at the point 122 the closest distances 124, 126, and 128 to the triangles 130, 132 and 134 are shown. For each point, the distances to all of the triangles in the triangle list 136 are calculated and the minimum distance is stored as the distance in the distance map as shown in a formulation 138.

Figure 8B:
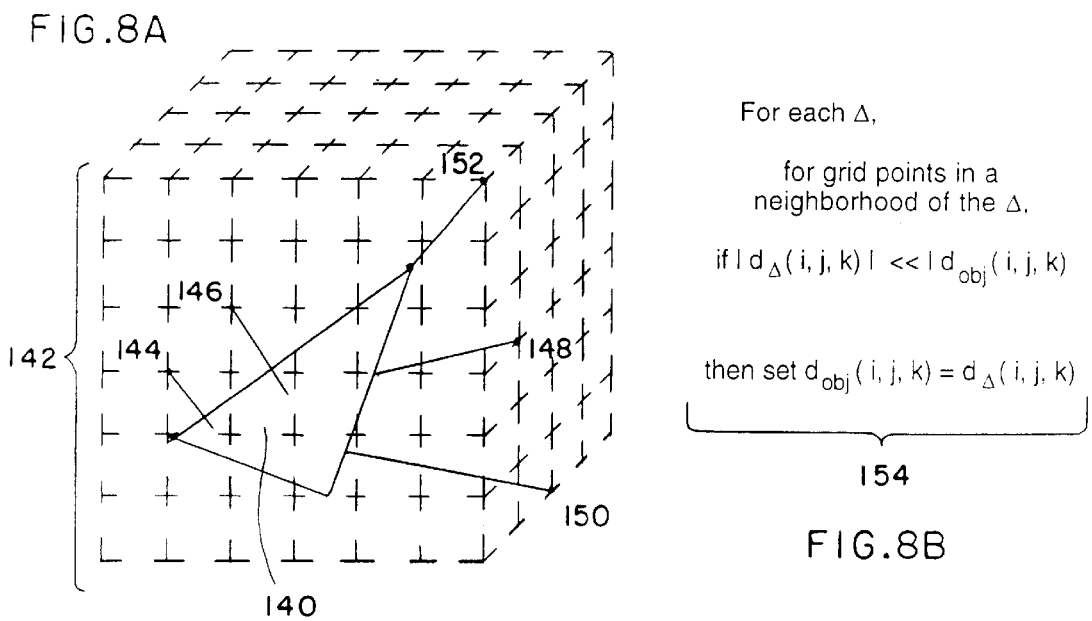
FIG. 8B is pseudocode for replacing distances in a distance map.

FIG. 8A shows a triangle-based method for calculating the distance map. Each triangle 140 is considered once and a local region of the distance map for that triangle 142 is updated. Here, grid points 144 and 146 are closest to the triangle face, grid points 148 and 150 are closest to a triangle edge, and grid point 152 is closest to a triangle vertex. As the distance at each vertex is calculated for the triangle, the distance is compared to the current distance stored in the distance map. If the magnitude of the new distance is smaller, then the distance in the distance map is replaced with the new distance as shown in the pseudocode of 154 shown in FIG. 8B.

Both the triangle- and grid-based methods described with respect to FIGS. 7 and 8 are too slow for using distance maps when the shape or topology are being changed interactively. Even with the use of triangle binning in the triangle-based methods, and reduced extent and other speedups for the grid-based method, it is very difficult to achieve reasonable rates for generating new distance maps for object models with reasonably large numbers of triangles.

The subject invention addresses this problem with a means for estimating the true distance map given a single or multiple projected depth images of the object model.

Figure 9:
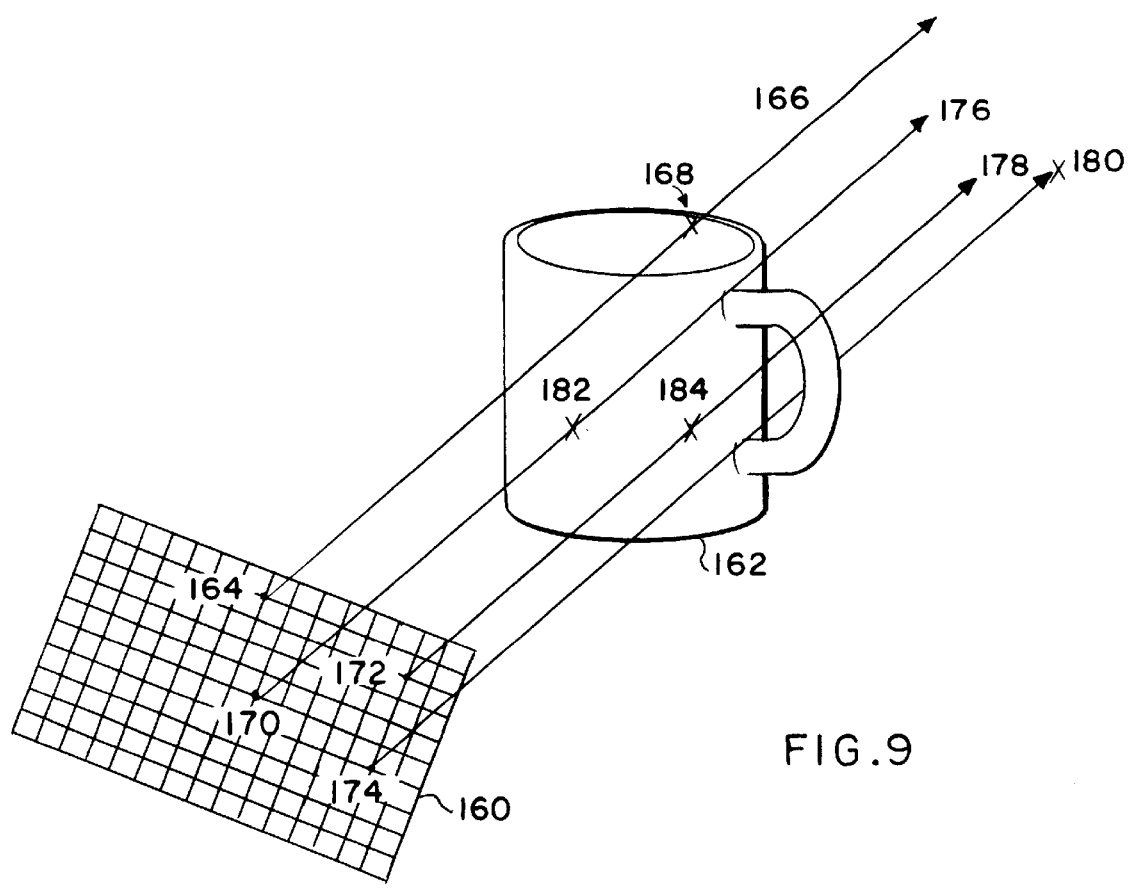
FIG. 9 shows the projected depth image of a 3D object.

As shown in FIG. 9, a projected depth image 160 is a 2D image where the value of each point on the image grid is the distance to the object model 162. The distance is measured along parallel rays projected towards the object. The rays are cast to the object in a direction that is perpendicular to the depth image. The distance is measured at the first point where the ray intersects the object. For example, for point 164, the ray 166 intersects the object at 168 and the distance from 164 to 168 would be stored in the depth image. Similarly, the distances from 170, 172, and 174 along the rays 176, 178, and 180 to the points 182 and 184, would be stored in the depth image. The ray 180 does not intersect the object. In this case, the distance stored at 174 is the distance to some pre-defined back plane. Using the convention that distances outside of the object are negative and distances inside of the object are positive, the distances at 164, 170, 172, and 174 would all be negative.

Figure 10:
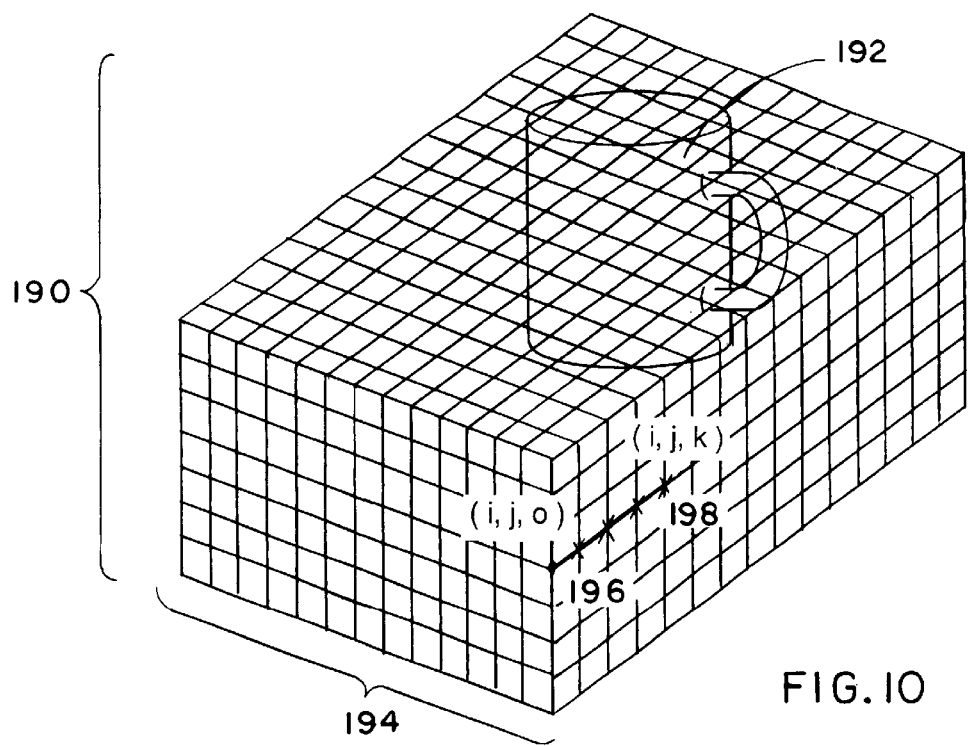
FIG. 10 is a diagrammatic description of the projected distance volume generated from the projected distance image.

As shown in FIG. 10, a projected distance volume 190 for an object 192 is calculated from the projected depth image 194 as follows. For a given point 198 at (i, j, k) in the projected distance map, the corresponding depth image point 196 is (i,j,0). Hence, the projected distance at 198 is related to the depth image at 196 according to the formulation:

$$dist(i, j, k) = dist(i, j, 0) + k,$$

where k is the grid increment perpendicular to the depth image. The value k is assumed to have the same scale and units as the projected distance values. Note that adding a positive k to the negative value stored at 196 will result in a distance value of zero in the projected distance map at the object surface.

Referring to FIG. 11, it will be appreciated that a single depth image can only be used to partially reconstruct the volume distance map because occluded surfaces and surfaces that are substantially perpendicular to the depth image are not represented in the projected distance map. Because the resultant projected distance volume is view dependent, it is most useful when the approximate viewing direction, or position, of the haptic interaction device is known.

Figure 11A:
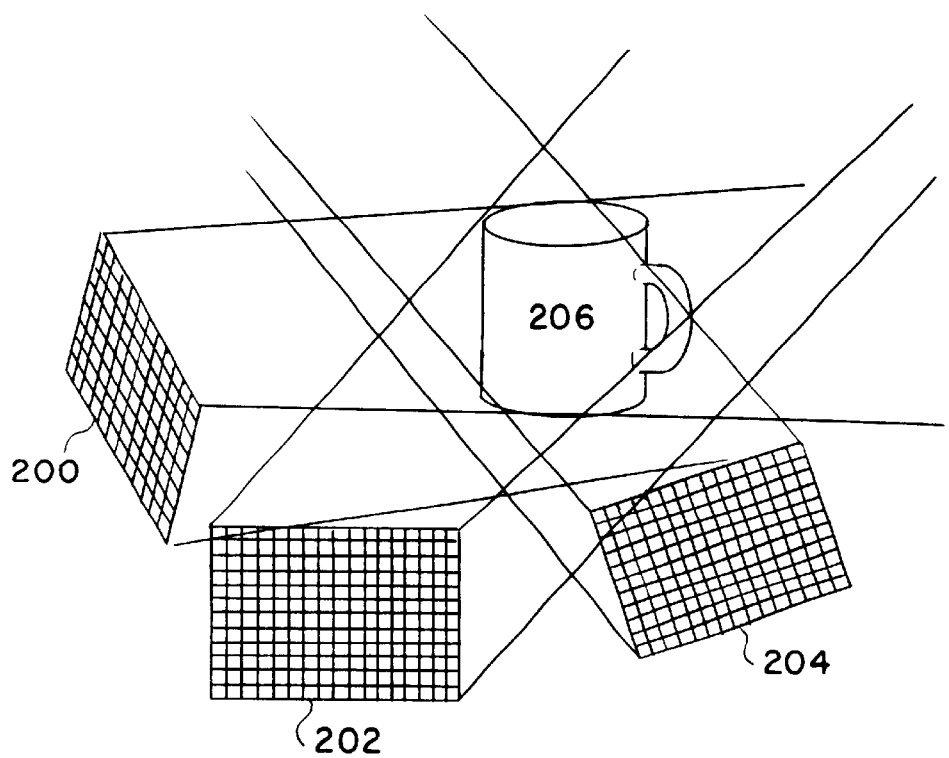
FIGS. 11A–B are diagrammatic descriptions of the projected distance volume generated from multiple projected images.

A more complete projected distance map of the object can be obtained when multiple depth maps, 200, 202, and 204, are calculated for the object 206 as illustrated in FIG. 11A.

Figure 11B:
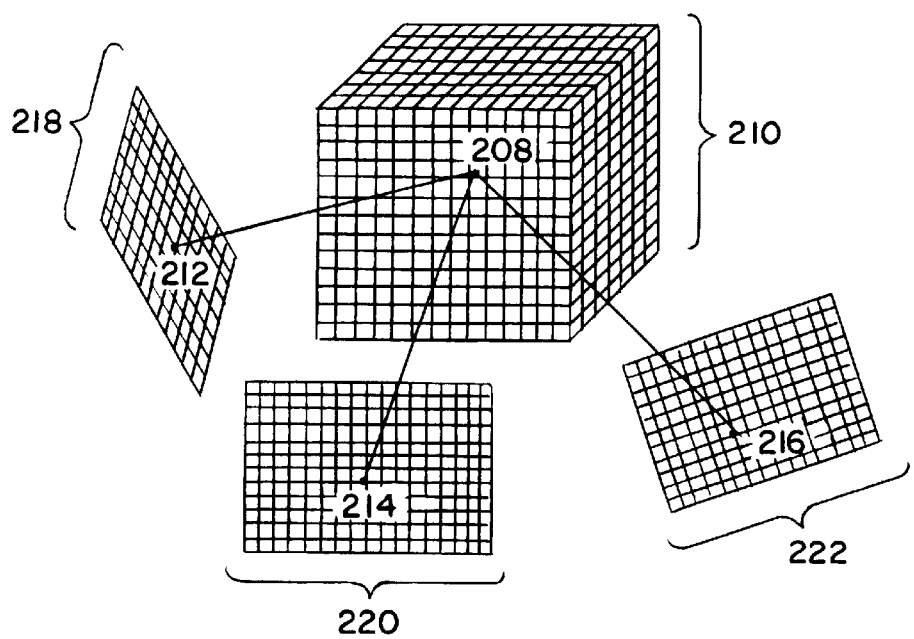

In FIG. 11B, the distance at a point 208 in the combined projected distance map 210 is calculated as the minimum of the distance that is calculated for that point from the distance values at 212, 214, and 216 in the depth images 218, 220, and 222, respectively. Note that the points 212, 214, and 216 do not necessarily lie at a grid point in their respective depth images. Hence, distances in the depth images may need to be interpolated in order to calculate the correct projected distances at the point 208 in the projected distance volume. A bilinear interpolation method can be used for this purpose.

Figure 12A:
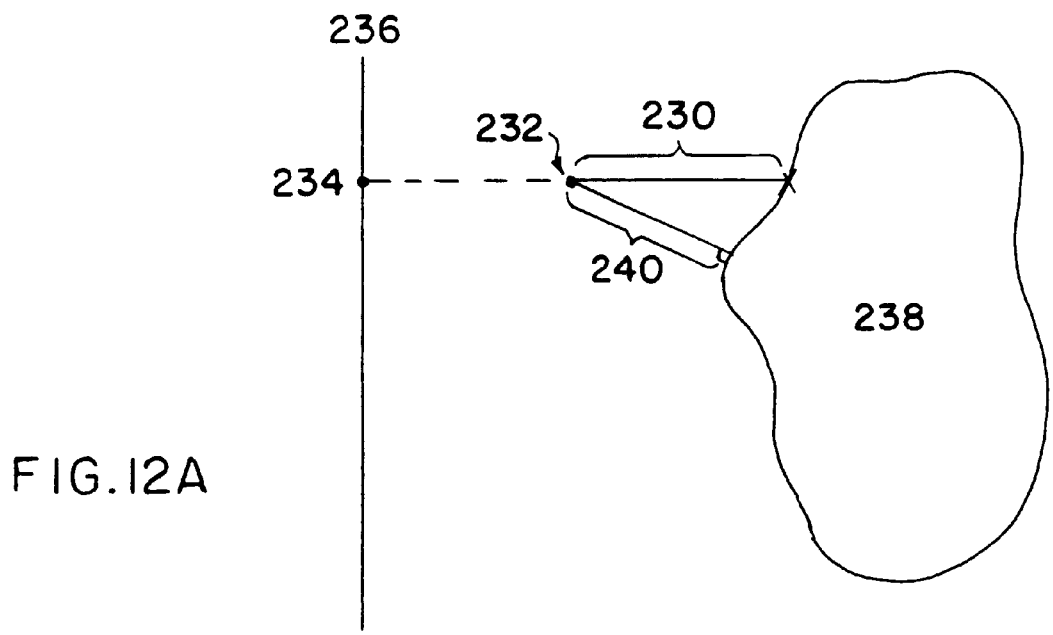
FIGS. 12A–B are diagrammatic descriptions of the relationship between the projected distance and the true distance to a planar surface in 2D.

FIG. 12 shows that the projected distances that are calculated from depth images are not the same as the true minimum distances from a point to the object. For example, in FIG. 12A, the projected distance 230 from point 232 to the object 238 along the ray originating at the point 234 in the depth image 236 is significantly longer than the true distance 240.

Figure 12B:
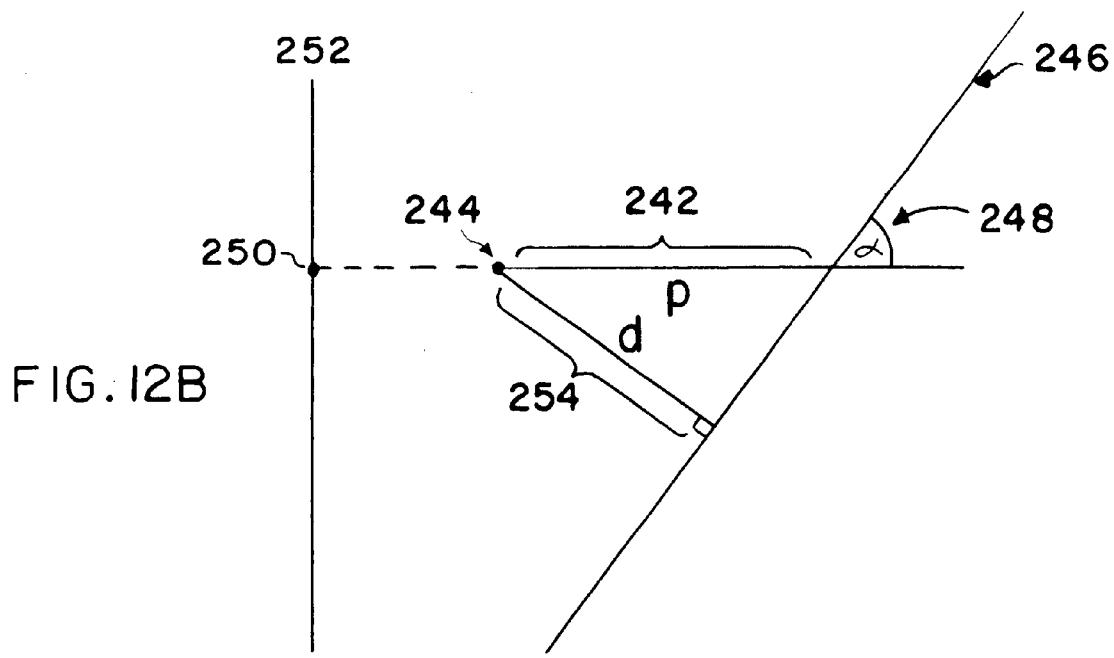

Referring now to FIG. 12B, when the object is planar in 3D, or linear in 2D, then the projected distance has a simple geometric relationship to the true distance. This is illustrated here in 2D. It can be shown geometrically that the projected distance p at 242 from the point 244 to the line 246 which lies at an angle q, at 248 from the y-axis along a ray originating at point 250 perpendicular to the depth image plane 252 is related to the true distance d, at 254 by the equation: $d = p \sin(q)$.

In addition, it can be shown that when the gradient of the projected distance map is calculated using the central difference operator, the gradient has a magnitude of $2/\sin(q)$. Using these two relationships, it will be appreciated that in 2D, dividing distances in the projected distance map by one half of the magnitude of the gradient of the projected distance map calculated by using the central distance operator, the resultant adjusted distance map is equal to the true distance map for linear objects.

It can be shown geometrically that the same relationship holds for planar surfaces in 3D, that is, for planar surfaces, the true distance map can be obtained from the projected distance map by dividing the projected distances by one half the magnitude of the gradient of the projected distance map. For objects that are piecewise planar or objects whose curvature is relatively small, then the adjusted projected distance map will approximate the true distance map quite well close to the object surface.

Figure 13:
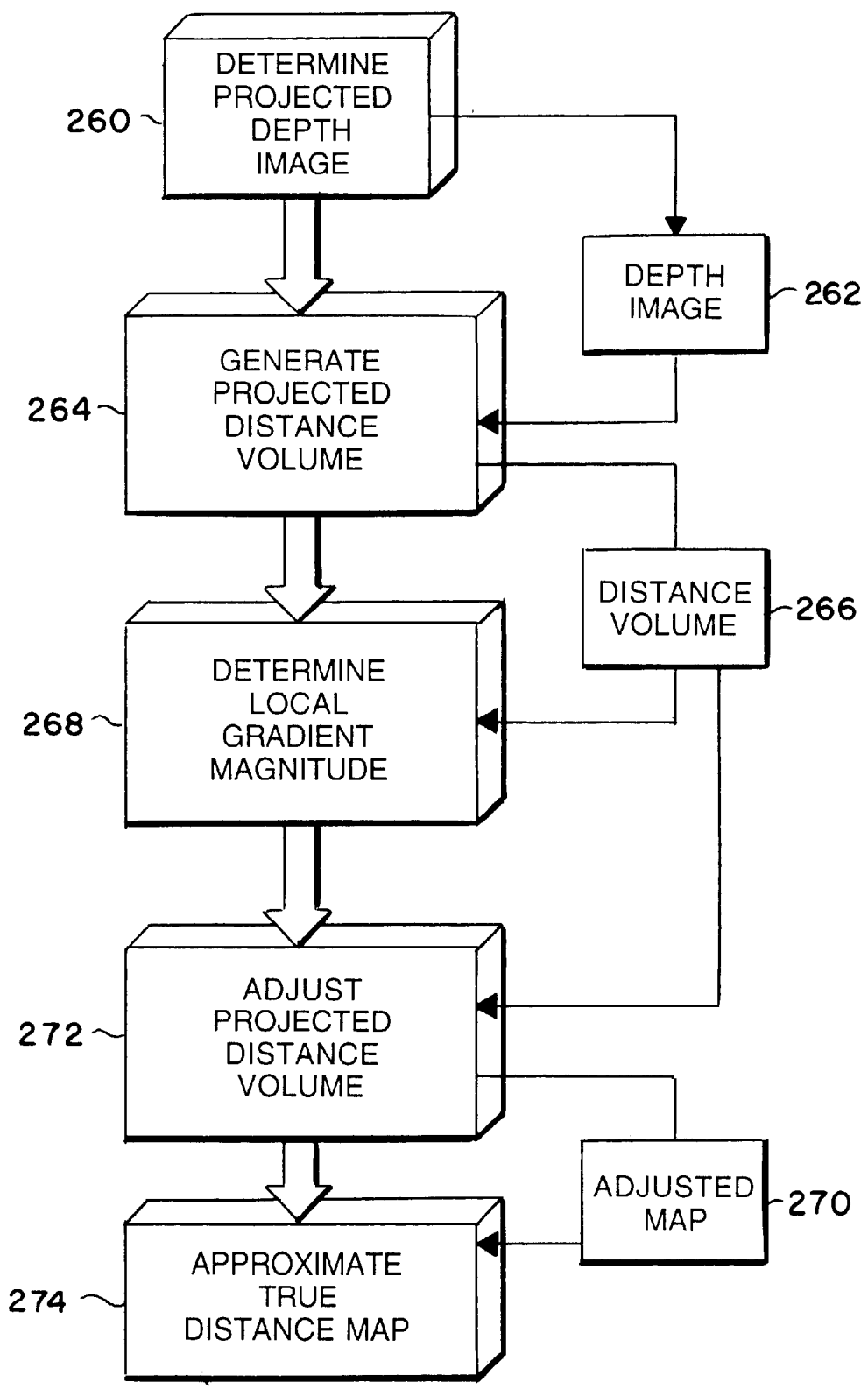
FIG. 13 is a flow diagram of a process for estimating the true distance map from a projected distance map.

FIG. 13 shows the method steps for approximating the distance map for an object from single or multiple depth images. In step 260, a single depth image or, alternatively, multiple depth images 262, are calculated or generated either from a computer model or from measurements from a real object. These depth images are then used in 264 to create the projected distance volume 266.

If multiple depth images are used, then the images must be re-sampled in order to generate the projected distance volume. In step 268, the local gradient magnitude of the projected distance volume is determined at sample points throughout the volume. Each distance in the projected distance volume is then adjusted by dividing by one half of the magnitude of the local gradient of the projected distance volume. This adjusted distance map 270 is used as an approximation of the true distance map in the application.

Figure 14:
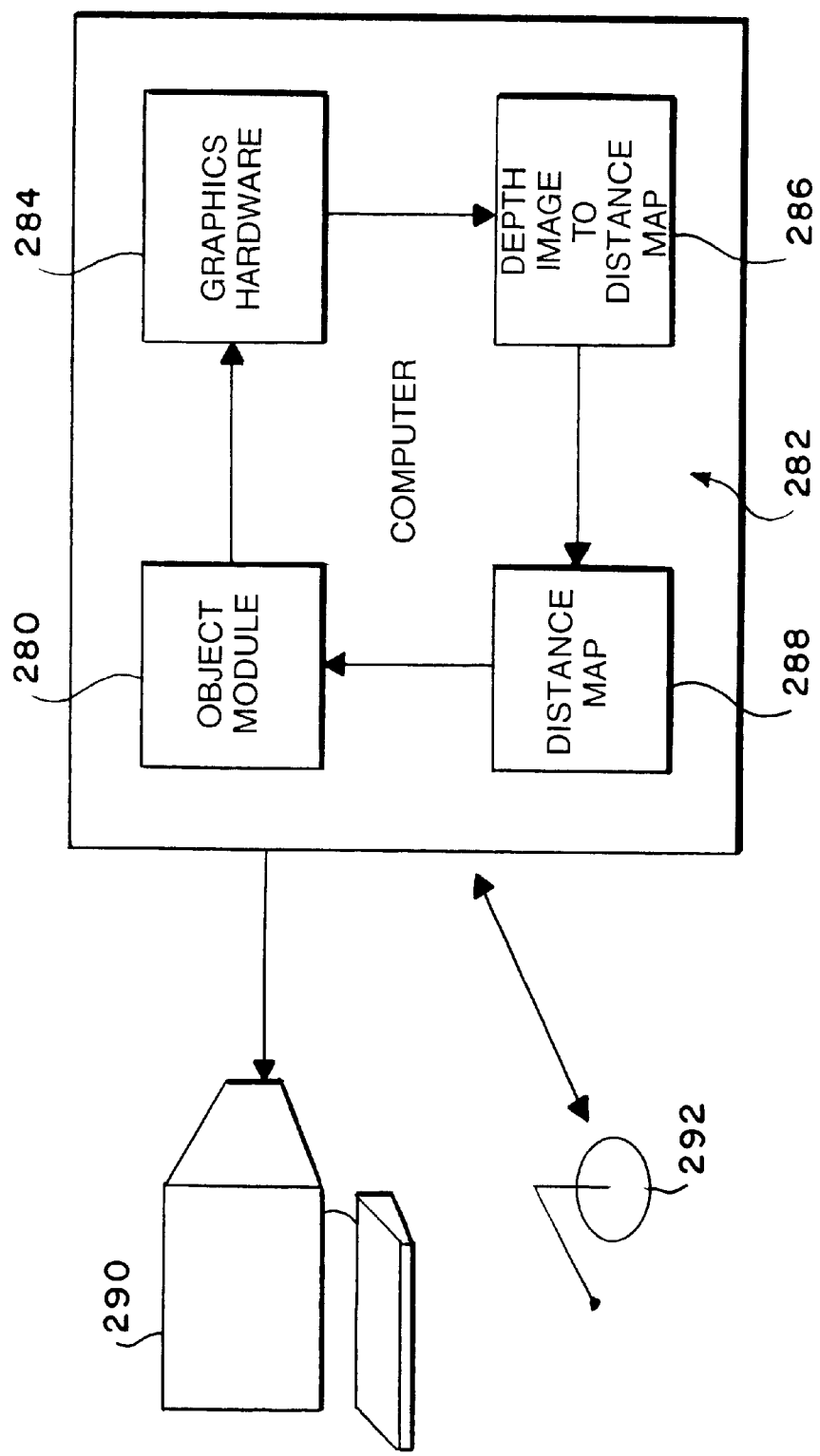
FIG. 14 is a block diagram of a system that uses hardware-assisted rendering and a graphics z-buffer for fast generation of projected distance images.

FIG. 14 shows a system that uses graphics hardware and a z-buffer to calculate depth images for triangulated object models. An object model 280 on a computer CPU 282 is rendered onto the depth image plane with the graphics depth test activated using the graphics hardware 284. The depth image is then read from the graphics z-buffer and sent to the system which generates an approximate distance map from single or multiple depth images 282. This distance map is used in a number of applications such as haptics, rendering, physical modeling, and the like in step 288, which may result in modification of the object model, requiring that the distance map be recalculated. A monitor 290 and a haptic or other input device 292 can be used to give visual or haptic feedback and for user input.

Figure 15:
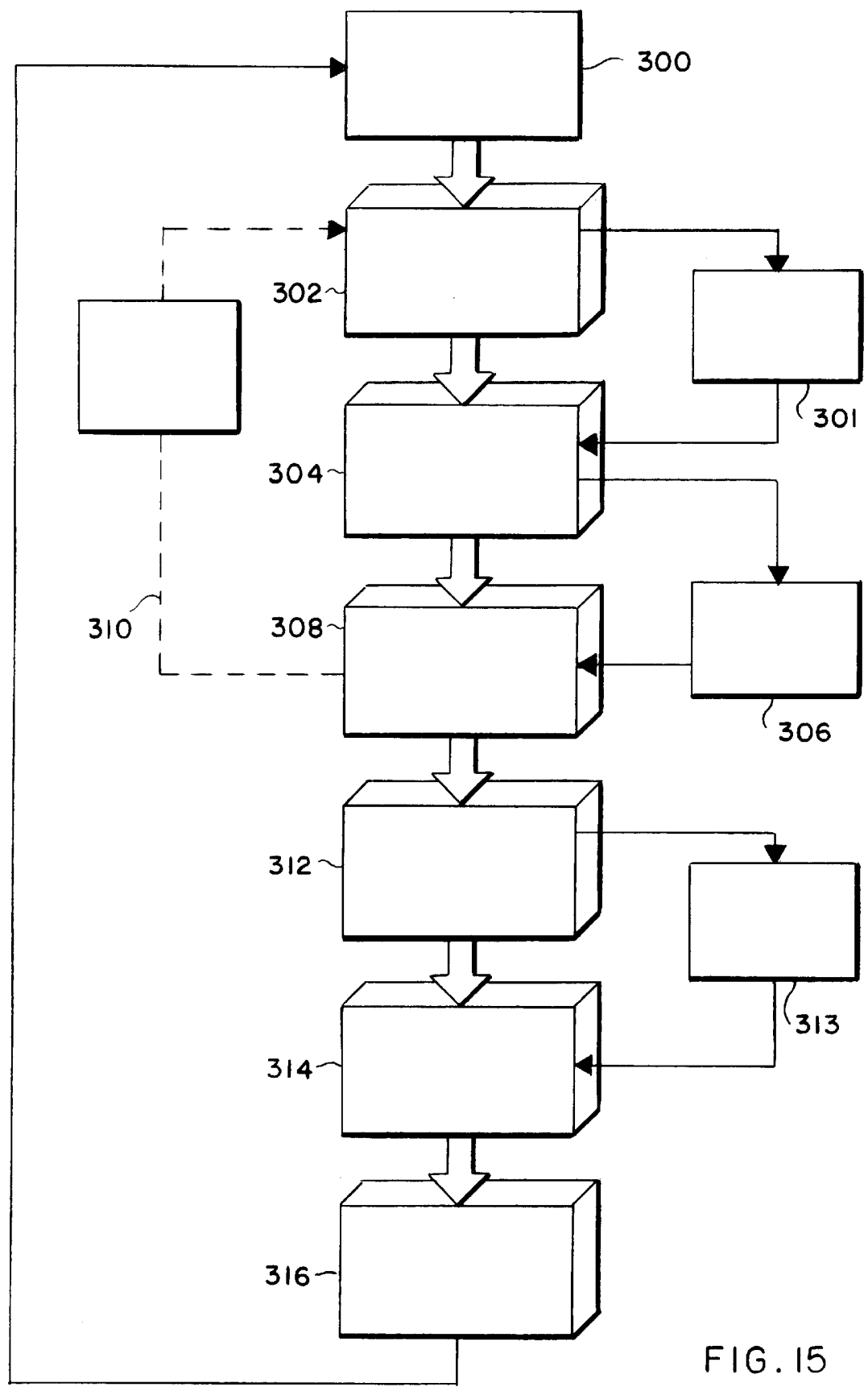
FIG. 15 is a flow diagram of a process for hardware-assisted estimation of distance maps from triangulated object models.

FIG. 15 shows the operational steps for a system that uses the graphics hardware and the invention for fast approximation of distance maps from a triangulated object model.

A triangulated object model 300 is rendered in step 302 with the graphics depth test activated. The z-buffer is read in step 304 to produce a projected depth image. This depth image is used to generate or improve a projected distance volume in step 308. If multiple depth images are used, steps 302 through 308 are repeated via line 310. The projected distance volume is then adjusted in step 312 by dividing distances by one half the magnitude of local gradient magnitudes of the projected distance volume.

This adjusted distance map can be used to approximate the true distance map 314 in interactions with the object model for haptics, volume rendering, and physically-based simulations, step 316. When these interactions cause changes in the object shape or topology, the process is repeated to generate a new distance map.

Figure 16:
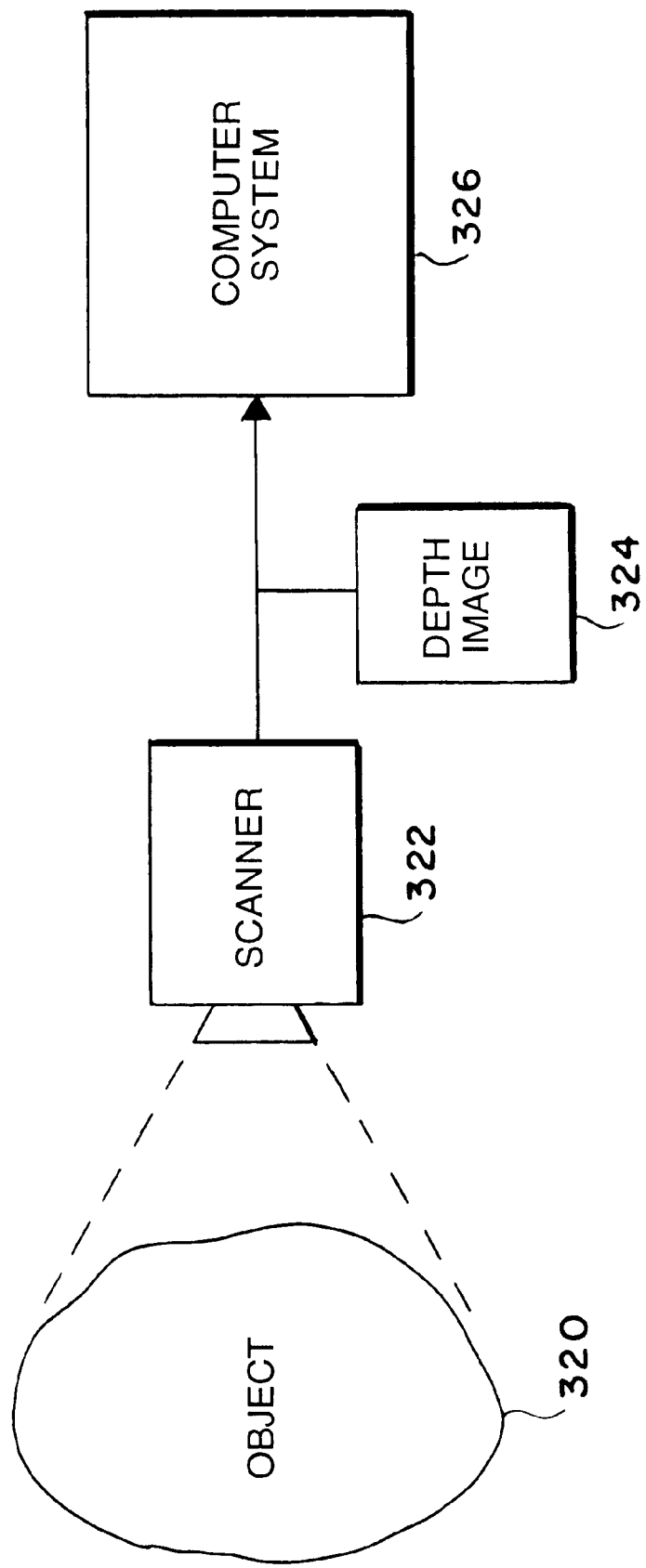
FIG. 16 is a block diagram of a system that uses a range scanner to generate multiple depth images and the subject invention to generate a distance map for a real object.

Referring to FIG. 16, a schematic diagram for a system that uses the subject invention for scanning the shape of a real world object is shown. In this system, the object 320 is scanned with a range scanner 322 to generate a 2D depth image 324 of the object. The depth image is sent to the computer 326. It will be appreciated that multiple depth images can be generated either by moving the camera or rotating the object.

Figure 17:
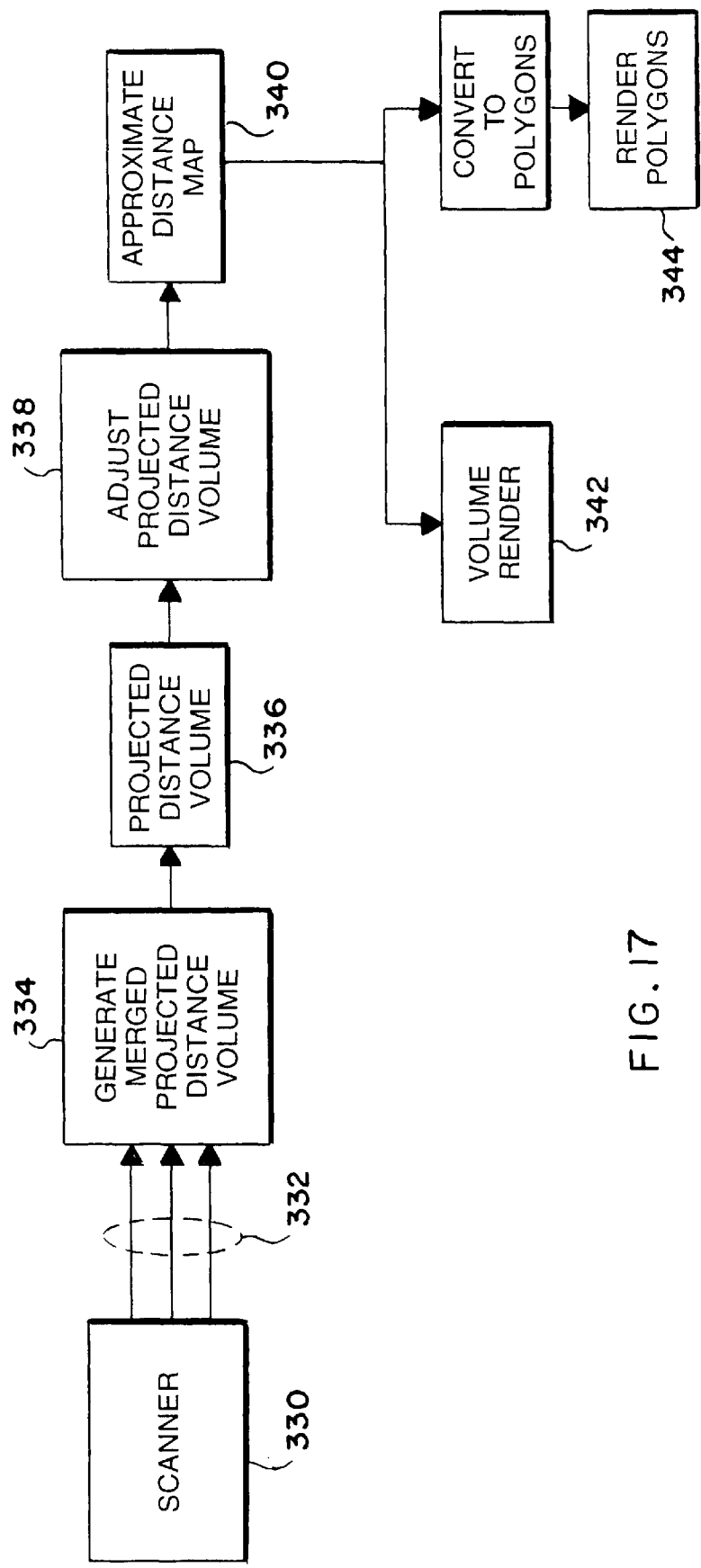
FIG. 17 is a flow diagram of a system that uses a range scanner to generate multiple depth images and the subject invention to generate a distance map for a real object.

Referring to FIG. 17, a flow chart of a system that uses the subject invention for scanning the shape of a real world object is shown. The scanning device 330 generates multiple depth images 332 from different views of the object. These depth images are interpolated and combined in step 334 to create a projected distance volume 336. The projected distance volume is then adjusted in step 338 to generate an approximate distance map 340.

It will be appreciated that the accuracy of the approximate distance map will improve when more depth images are used to generate the projected distance map. The approximate distance map will then be used by the application. In step 342, the distance map is used to provide a shaded volume rendered image of the object. In step 344, a surface tiling method is used to convert the distance map to polygons and then the polygon model is rendered using graphics hardware.

Described is a preferred embodiment of the invention. It should be apparent to those of ordinary skill in the art that modifications and alternatives can be practiced within the spirit of the invention. It is accordingly intended to define the scope of the invention according to the following claims.

We claim:

1. A method for generating a volumetric distance map of an object, comprising the steps of:
   generating a depth image of the object;
   projecting the depth image to obtain a projected distance volume of the object, the projected distance volume having a plurality of sample points, each sample point of the projected distance volume representing a distance from the distance map to a surface of the object;
   determining a magnitude of a local gradient at each sample point of the projected distance volume;
   dividing each distance at each sample point by the magnitude of the corresponding local gradient at each sample point to obtain a scalar distance to a closest surface of the object.

2. The method of claim 1 wherein the distances are determined by casting parallel rays from the depth image to the object, and locating the first point where each ray intersects the object.

3. The method of claim 2 wherein a given sample point at (i, j, k) in the projected distance volume is related to a corresponding point (i, j, 0) in the depth image according to dist(i, j, k)=(i, j, 0)+k, where k is a grid increment perpendicular to the depth image.

4. The method of claim 1 wherein a plurality of depth images is generated.

5. The method of claim 4 wherein the distances of the projected distance volume are interpolated from the plurality of distance maps.

6. The method of claim 1 wherein the volumetric distance map is used to control a robot.

7. The method of claim 1 wherein the volumetric distance map is used to control a haptic device.

8. The method of claim 1 wherein the volumetric distance map is used to shade a rendered image of the object.

9. The method of claim 1 wherein the volumetric distance map is used to generate a model of a real object.

10. The method of claim 1 wherein the depth image is read from a z-buffer of a graphics device.

11. The method of claim 1 wherein the depth image is measured using a scanner.

* * * * *